US005646801A

United States Patent [19]

Boigenzahn et al.

[11] Patent Number: 5,646,801
[45] Date of Patent: Jul. 8, 1997

[54] DIRECT ACCESS STORAGE DEVICE WITH IMPROVED RELIABILITY FLEX CABLE MOUNTING

[75] Inventors: Jeffrey Fred Boigenzahn, Pine Island; Randy Joseph Bornhorst, Rochester; Dale Ernest Goodman, Oronoco; Richard Edward Lagergren, Rochester, all of Minn.

[73] Assignee: International Business Machines Corporation, Armonk, N.Y.

[21] Appl. No.: 527,589

[22] Filed: Sep. 13, 1995

Related U.S. Application Data

[63] Continuation of Ser. No. 298,526, Aug. 30, 1994, abandoned.

[51] Int. Cl.[6] ................................................. G11B 33/12
[52] U.S. Cl. ............................................................ 360/97.01
[58] Field of Search ............................... 360/97.01, 97.02, 360/97.03, 97.04, 98.01, 106; 369/75.1; 361/685, 749, 756, 758, 789

[56] References Cited

U.S. PATENT DOCUMENTS

| | | | |
|---|---|---|---|
| 4,923,406 | 5/1990 | Bucknam | 439/77 |
| 4,965,684 | 10/1990 | Stefansky | 360/78.12 |
| 5,113,317 | 5/1992 | Howe | 361/756 X |
| 5,214,550 | 5/1993 | Chan | 360/97.01 |
| 5,241,436 | 8/1993 | Kawabata et al. | 360/97.01 |
| 5,241,438 | 8/1993 | Matsushima | 360/105 |
| 5,270,887 | 12/1993 | Edwards et al. | 360/97.03 |
| 5,278,709 | 1/1994 | Thornton et al. | 360/97.01 |
| 5,291,355 | 3/1994 | Hatch et al. | 360/97.01 |
| 5,508,860 | 4/1996 | Takagi et al. | 360/97.01 |
| 5,541,787 | 7/1996 | Jabbari et al. | 360/97.01 |
| 5,543,982 | 8/1996 | Takagi et al. | 360/97.01 |

Primary Examiner—Robert S. Tupper
Assistant Examiner—William R. Korzuch
Attorney, Agent, or Firm—Laurence R. Letson

[57] ABSTRACT

A Direct Access Storage Device (DASD), either magnetic or optical, wherein the chamber which encloses the disk, actuator and electrical connections is sealed from the outside conditions by disposing a seal or gasket about a connector which is surface mounted on a flex cable and disposing the connector in a passage through the base of the DASD. The flex cable is disposed adjacent the inner surface of the cover, and a tail portion of the flex cable is folded to an orientation to position the tail so that it may be attached to an actuator or similar mechanism within the DASD. The tail is maintained in its proper orientation once inserted into a slot formed into the base member. The slot side walls constrain the tail without the need to have the tail fixedly attached to the base member at any point and thereby easing assembly, disassembly, rework and/or repair of the DASD. Compressive forces exerted on the flex cable by the cover and cover screws effectively ground the flex cable through a grounding tab engaged with the base. Further, the compressive forces exerted by the cover against the flex cable, gasket, and base member insure an effective seal of the internal chamber of the DASD from the exterior conditions.

10 Claims, 2 Drawing Sheets

DIRECT ACCESS STORAGE DEVICE WITH IMPROVED RELIABILITY FLEX CABLE MOUNTING

This application is a continuation of application No. 08/298,526, filed on Aug. 30, 1994, now abandoned.

FIELD OF THE INVENTION

This invention relates to Direct Access Storage Devices (DASD) and more specifically to the simplified and reliable mounting and installation of an electrical flex cable within a DASD housing.

BACKGROUND OF THE INVENTION

As computers and personal computers have been significantly reduced in size from desktop models using 5¼ inch disk drives to laptop and notebook computers, the disk drives have been reduced to 3½ inch floppy disk drives and smaller hard disk drives or DASD.

The DASD must be sealed from the ambient environment to prevent contamination from dust and other substances which might affect either the electromechanical operation of the device or contaminate the disk surface, thereby causing damage to the recordable disk surface, preventing reliable data storage and retrieval. Sealing the disk drive must be accomplished in a manner which accommodates the need to electrically connect the disk drive to the circuit which provides power to the actuator motor. Additionally, data signals must be conducted either to or from the magnetic head on the arm of the actuator, and conductors must convey the data signals between the magnetic head/disk interface and the external circuit for use by the computer or recording onto the disk.

Data signals conveyed between the magnetic head on the actuator load beam and the using circuits external to the DASD must be reliable. To insure reliability of these data signals, the DASD must have highly reliable conductive circuit paths that also accommodate movement of the actuator as the actuator positions both the slider and magnetic head relative to the surface of the magnetic disk.

As the DASD size is reduced and while continuing to provide highly reliable service, the size of all the internal and external components of the DASD similarly must be redesigned to become either more compact or eliminated. One aspect of this size reduction requires that the circuits for electrical power and data transmission must be reduced in size and thickness in order to conserve space and particularly to permit the reduction in height of the DASD. With the reductions in height and size of the DASD, electrical and structural reliability of the circuits must be maintained even as the individual DASD components are reduced, particularly the electrical circuits which include connectors and position maintaining devices. One approach to reducing the size of the electrical circuit and associated components is to eliminate some, if not all, connectors and parts or devices that have been previously required to mount the electrical circuits. As connectors are eliminated, some sources of unreliability also are eliminated. Connectors are notorious as sources of problems in electrical circuits; and by eliminating connectors from the circuits wherever possible, not only are potential reliability problems associated with those connectors likewise are eliminated but also the space provided for such connectors within the structure is no longer required.

Wherever flex cables previously have been used to conduct data and/or power to devices which move relative to a fixed portion of the flex cable, a flexible circuit has been positioned or disposed in such a manner that the flexing of the flexible cable as much as 90 degrees or more will not unduly deteriorate the electrical transmission characteristics of the flex cable. The flex cable must not have any kinks, sharp bends or twists which would concentrate the stress of the flexing and eventually would cause the electrical traces or conductor paths to break.

Flex cables have been used to accommodate movement of actuators and analogous devices in disk drives. In the past, proper orientation for the flex cable typically has been accomplished by attachment of the flex cable and its connections to a connector, which is further mounted to a circuit board. Examples of such implementations can be found in U.S. Pat. Nos. 5,291,355 and 5,214,550. In addition to the fact that the connections between the flex cable and the connectors can be sources of electrical faults in implementations, such as found in the above two cited patents, connectors with flex cable attachments consume precious space and ultimately may dictate the minimum height of the DASD.

An alternative approach which has been described in U.S. Pat. No. 5,278,709 adhesively attaches the flex cable to a stationary surface in the DASD housing to orient and mount the flex cable. Such adhesive attachment to the DASD housing creates problems because the adhesive may outgas over time and thereby contaminate the sealed environment of the DASD and possibly damage the disk surface, the slider, or other components enclosed within the DASD housing. Additionally, any such adhesive attachment of the flex cable to a rigid portion of the housing creates disassembly, rework, and repair problems if the device would need to be disassembled for repair or for other service.

While generally quite reliable in their intended use, flex cables with very thin dimensions are quite fragile due to the lack of physical strength of the flex cable and the conductive traces. If adhesively attached to rigid surfaces of the DASD housing, the flex cable may not be satisfactorily removed for repair or service to the DASD without damage to the cable and thereby would necessitate its replacement.

OBJECTS OF THE INVENTION

It is an object of the invention to provide a design for a DASD which permits ease of assembly.

It is a further object of the invention to eliminate as many connectors as possible for the flex cable from the design of a DASD.

It is still another object of the invention to eliminate as many flex cable mounting devices as possible in a DASD.

It is an additional object of the invention to improve electronic reliability through the use of a flex cable with the minimum number possible connectors and mounting devices associated therewith.

It is still an additional object of the invention to position and immobilize the flex cable of a DASD without rigid attachment to the DASD housing.

Other objects of the invention will become apparent from an understanding of the detailed description of the invention that follows.

The disadvantages and shortcomings of the prior art are overcome and the objects of the invention accomplished by the subject invention.

SUMMARY OF THE INVENTION

A Direct Access Storage Device (DASD) is housed within a shell formed by a cover member and a base member. The cover and base members mate to form a closed chamber enclosing the rotatable disk and the actuator of the DASD as well as the other related mechanisms and circuits necessary for the DASD operation.

The actuator contained within the DASD shell receives electrical signals through a flex cable to operate the actuator motor and data signals for controlling the recording of domains on the disks of the DASD. The flex cable generally is a flat flexible substrate with electrically conductive traces or conductor paths formed thereon and also may have disposed on a surface thereof discrete electrical components which will form a preamplifier or other type circuit. The flex cable normally is terminated with a connector which permits interfacing with the circuitry of the host machine, typically a computer.

The flexible circuit is provided with a grounding tab which typically is an extension, of a ground line, to an area where an enlarged grounding pad is formed to engage with the shell or housing of the DASD. The grounding tab has at least one surface of the ground conductor exposed for face-to-face engagement with a surface of the DASD shell. The grounding tab advantageously has a hole extending through the tab to accommodate a screw used to attach the cover and base members to each other and thereby to trap the grounding tab between the cover and the base members, providing a reliable grounding contact for the flex cable.

The flex cable further is provided with a tail comprised of a plurality of conductors extending generally along the tail and ending in termination pads in order that the tail may be electrically connected to conductors resident on the actuator mechanism of the DASD. Whenever the tail is connected to the actuator mechanism and the actuator caused to operate by pivoting around its pivot axis, the tail must flex to accommodate the pivoting motion of the actuator.

The flex cable, including any preamplification circuitry, generally lies in a plane parallel with the plane of the cover member and typically is positioned with one surface of the flex cable in face-to-face relationship with an interior surface of the cover member. In order for the tail of the flex cable to flex a large number of times and yet remain a reliable conductor of electrical signals, the tail must be oriented so that the tail will be in a position substantially orthogonal to the plane of movement of the device to which the tail is attached. This orthogonal orientation is necessary to connect the tail of the flex circuit with the actuator and to accommodate the movement of the actuator without kinking, crimping, bending, or realizing any other high stress effect on the tail and particularly on the electrical conductors thereof.

By its very nature, the flex circuit permits bending at a reasonable radius; the tail may be physically attached to or formed as a part of a larger flex circuit at the side of the tail, and conductors may extend from the tail to the remainder of the flex circuit at this point. The tail may be folded or bent through a gentle radius along its edge so that the tail and particularly the portion attached to the remainder of the flex cable can be oriented substantially perpendicular at that point to the remainder of the flex cable. The radius must not be so small as to cause breakage of the conductors within the flex cable.

With the tail thus oriented, the tail and particularly the distal end of the tail is connectable to the actuator to provide electrical signals to the actuator throughout a substantial range of actuator movement.

To ensure that the tail of the flex circuit remains in the desired orientation relative to the remainder of the flex cable, it is essential to constrain the tail in its perpendicular orientation, as previously described. The base member of the DASD housing is provided with a portion which extends upwardly from the bottom or floor of the base member and has a substantial thickness relative to the overall height of the DASD. This upwardly extending mass of material is formed with a slot extending through a portion thereof, the slot being substantially perpendicular to the plane of the base member and accordingly is also perpendicular to the plane of the cover member. The slot is open-ended on at least one end in order to permit the tail to extend out through at least one end thereof. The side walls of the slot act to constrain the proximal end of the tail which is attached to the remainder of the flex circuit in a perpendicular orientation to the remainder of the flex circuit. The slot retains the tail in its orientation without the need or use of any attaching devices or adhesives. Accordingly, the tail of the flex circuit may be folded and inserted into the slot to ensure appropriate orientation during assembly; and should the need arise, the DASD may be disassembled by removing the cover and exposing the flex circuit, which then may be easily removed from the DASD housing since it is not clamped or adhered to the DASD housing components.

Removal of the inventive flex circuit from the DASD housing necessitates the disconnection of the flex circuit from the actuator mechanism or the removal of the actuator mechanism while attached to the tail of the flex circuit. Since the flex circuit is not clamped, attached, or adhered to any portion of the DASD base member, then removal of the flex circuit will be easy and will not damage the flex circuit once the cover member is removed.

The base member of the DASD is fabricated with a passage which extends substantially perpendicular to the plane of the floor of the base member and extends into the chamber defined by the base member and the cover member. The passage is configured to accept a connector. The connector typically is surface mounted to one of the faces of the flex circuit and inserted into the passage as the flex circuit is installed over the DASD base member. The passage is fabricated having such a height, once the cover is installed, that a limited space exists between the top surface of the portion of the base member defining this passage and the cover. Accordingly a seal, typically a gasket, is disposed along the top end surface of the portion of the base member forming the passage and the connector inserted through the hole in the gasket.

Since the connector is attached to one face of the flex circuit, the gasket will engage that same face as well as the portion of the base member defining the passage; and with the cover attached to the base member, the compressive forces exerted by the cover screws will compress the seal, forcing the flex circuit against the interior surface of the cover member. The gasket will effectively seal the internal chamber of the DASD from any external ambient conditions.

The connector terminating the flex circuit and disposed within the passage is available for engagement with a corresponding mating male connector on a circuit card that operates and provides electronic control of the DASD.

The clamping of the cover by the cover screws accomplishes both the engagement of the grounding tab with the cover components as well as the sealing of the chamber within the DASD, insuring a reliable ground connection. With the cover member in position and attached to the base member, the portion of the tail of the flex circuit residing in the slot is effectively trapped and cannot escape. The slot insures the proper orientation of the tail to permit the tail to flex in response to the movement of the actuator within the chamber of the DASD.

A more complete and detailed understanding of the invention may be gained from reference to the detailed description to follow and the drawings attached to this specification.

DETAILED DESCRIPTION OF THE PREFERRED EMBODIMENT OF THE BEST MODE FOR CARRYING OUT THE INVENTION

Figure 1:
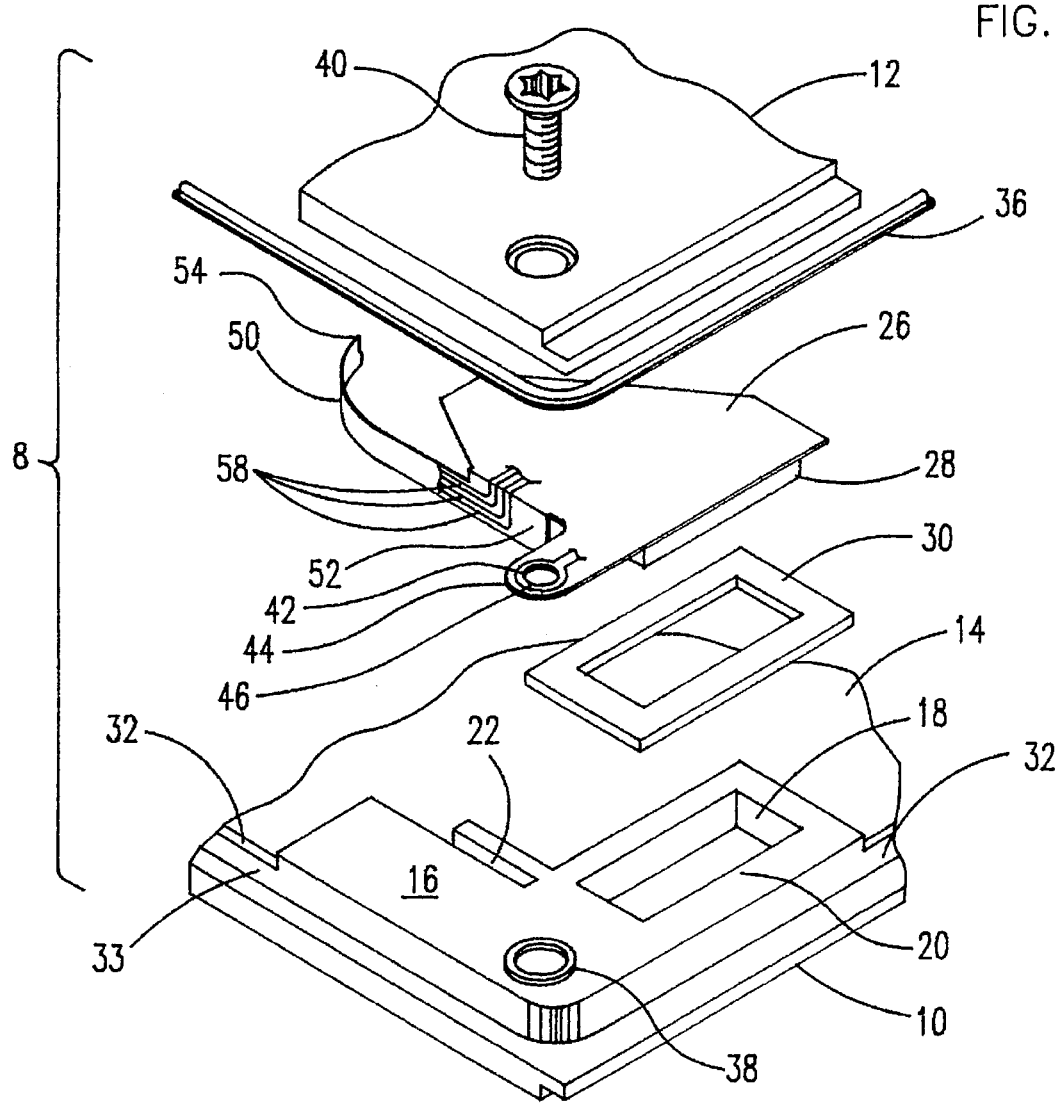
FIG. 1 is an exploded, partial DASD showing a passage for the connector, a seal, and the flex circuit oriented for installation within the flex cable and illustrates the tail oriented for insertion into the slot in the face member.
Figure 2:
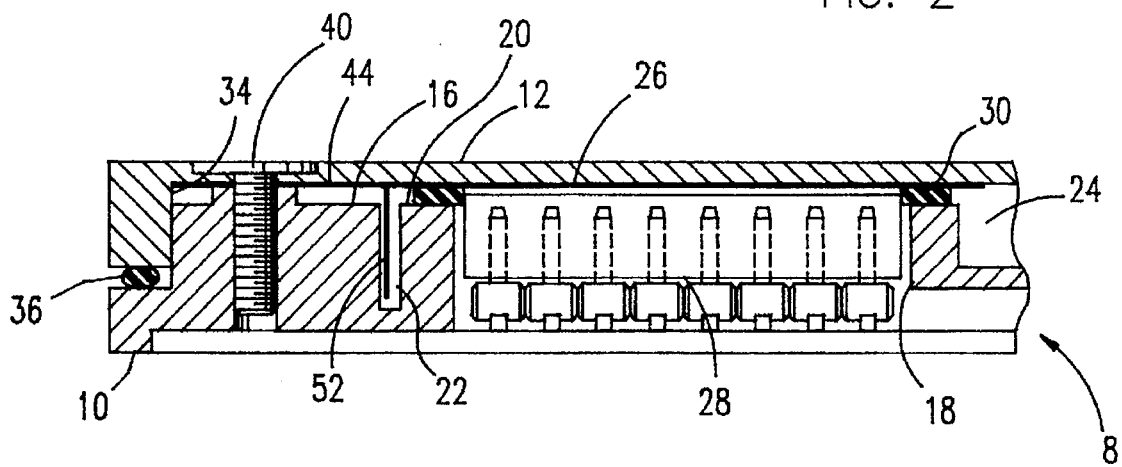
FIG. 2 is a partial sectional view of an assembled DASD incorporating the invention.

With initial reference to FIGS. 1 and 2, base 10 and cover 12 of the housing 8 of a DASD are provided. Base 10 is configured to mate with cover 12 to form a chamber 24. Base 10 and cover 12 are typically die cast or machined metal members. Base 10 provides not only a floor 14 but also a raised portion 16 which extends upwardly into the cover member 12.

Raised portion 16 provides material for defining a passageway 18 which extends from the inside of the DASD housing 8 to the exterior of base 10. The top surface 20 of raised portion 16 extends sufficiently into the chamber 24 formed by base 10 and cover 12 to be disposed relatively close to the interior surface of cover 12. Raised portion 16 further provides material to define a slot 22 formed therein and extended substantially perpendicular to the floor 14 of base member 10. Disposed within chamber 24, and as best observed in FIG. 2, is a flex cable 26. Flex cable 26 is fabricated of a flexible substrate such as MYLAR, a polyethylene terephthalate or other similar flexible polymeric sheet type material having deposited thereon electrical traces or conductors to form the desired circuitry. The flex cable 26 also may carry discrete electrical components which when appropriately connected will form an amplifier module.

Flex cable 26 may be terminated by connector 28 which is preferably surface mounted onto flex cable 26. Connector 28 is insertable into passage 18. Surrounding connector 28 and laying on the topmost surface 20 of the raised portion 16 is a gasket 30. Gasket 30 may be made out of a rubber or other synthetic compressible elastic material. Gasket 30 is preferably disposed between surface 20 and flex cable 26 to force flex cable 26 into intimate engagement with the cover 12 and to seal the region between surface 20 and the flex cable 26.

Further, base member 10 is provided with a flange 32 extending generally upward from the floor 14 of base 10 and defining a wall 33 which is insertable into cover 12 and cover wall 34, as best observed in FIG. 2. An "O" ring 36 or similar type of gasket seal 36 may be disposed between base member 10 and cover 12 circumscribing flange 32 to seal the housing 8.

Flex cable 26 is provided with a grounding tab 44 extending from the remainder of the flex cable 26 to a point where the tab 44 will overlie a grounding surface 38 formed on base 10. The grounding surface 38 may advantageously be in the form of a boss which accommodates a cover screw 40 extending through cover 12 and grounding tab 44. Cover screw 40 passes through hole 42 in the grounding tab 44 of flex cable 26 and traps the grounding pad 46 between cover 12 and boss 38.

Figure 3:
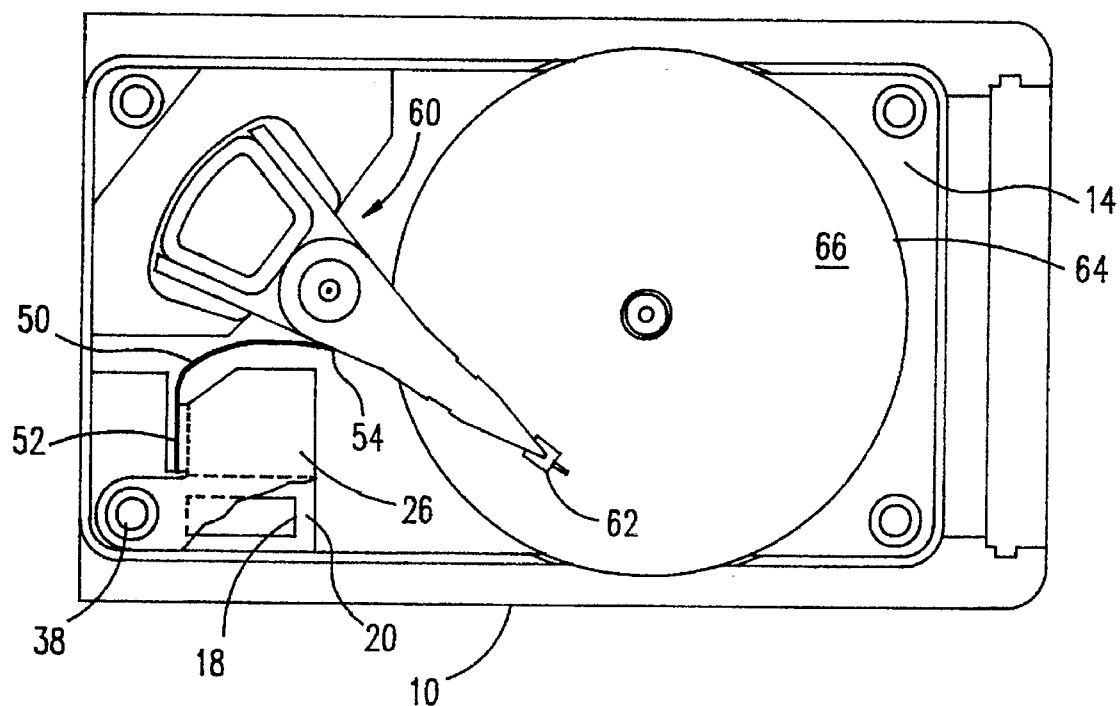
FIG. 3 is a top view of the base member, actuator, disk and the slot for orienting and retaining the tail of the flex cable.

Flex cable 26 may be formed in any advantageous shape; however, in order to provide electrical communication between flex cable 26 and the actuator 60 shown in FIG. 3, a tail 50 is required. Tail 50 is continuous at the side of proximal end 52 with the remainder of the flex cable 26 and may be folded or bent at that point. The distal end 54 of tail 50 is preferably further attached to a further small flex circuit portion (not shown) which is mountable on or attachable to the actuator 60.

The conductive traces 58 extending from flex cable 26 to tail 50 may be bent approximately 90 degrees but not sharply creased and still maintain continuity. Proximal end 52 of tail 50 is disposed into slot 22 as connector 28 is inserted through gasket 30 and into passage 18 during assembly. Slot 22 insures that the proximal end 52 of tail 50 remains oriented substantially perpendicular to the floor 14 of base 10, thereby assuring maximum flexibility of the unrestrained portion of tail 50 in response to movement of actuator 60 as the actuator 60 positions read/write head 62 over the surface 66 of disk 64, as best seen in FIG. 3.

With the compressive force from the cover screws 40 acting on flex cable 26 and gasket 30 and with connector 28 disposed within passage 18, flex cable 26 is held immobile relative to the DASD housing 8, composed of base 10 and cover 12 when fully assembled. With flex cable 26 immobile within the chamber 24, the proximal end 52 of tail 50 is trapped within slot 22 and constrained to the desired orientation thereby preventing tail 50 from assuming a position which would result in a kink, crease, twist or any other high stress configuration leading to damage of tail 50 and particularly conductors 58 or resulting in any restriction of the movement of actuator 60.

As can be seen from the foregoing and particularly with reference to FIGS. 1, 2, and 3, the flex cable 26 prior to final assembly is not fixedly attached to either the cover 12 or base plate 10. Upon removal of cover screws 40, the flex cable 26 may be easily disengaged from slot 22, and connector 28 may be extracted from passage 18 for removal along with actuator 60. The flex cable 26 then may be detached from actuator 60 if necessary by disconnecting any connections with the actuator coil or read/write head 62.

If the removal of the flex cable 26 connected to actuator 60 is deemed appropriate and the flex cable 26 otherwise is serviceable, other repairs may be made to the DASD 8 and flex cable 26, and actuator 60 reassembled with the DASD housing 8; removal of the flex cable 26 and tail 50 does not involve removing any of the flex cable 26 from any fixed attachment of either tail 50 or flex cable 26 with a portion of base member 10 or cover 12.

It should be further appreciated that the installation of flex cable 26 and particularly tail 50 is made significantly easier by virtue of the fact that the proximal end 52 of tail 50 only need be inserted into slot 22 to insure the proper orientation. Further, it can be appreciated that since tail 50 is held in its proper orientation by slot 22, there is no need for other retaining, clamping or positioning devices which may require additional height in the DASD housing assembly 8.

Referring now to FIG. 3, it can be appreciated that actuator 60 may be electrically driven to sweep read/write head 62 across the surface 66 of recording disk 64, mounted within cavity 24 for rotation.

While a preferred embodiment of the invention has been illustrated and described in detail in reference to a magnetic disk drive, this invention may be implemented in optical disk drives as well. It should be understood that modifications and changes may be made to this disclosed invention without departing from the scope of the claims appended hereto.

We claim:

1. A direct access storage device comprising:

a base member for supporting components of said device;

a cover member having a generally planar interior surface;

a data storage disk mounted for rotation within a chamber defined by said cover member and said base member;

an actuator mounted for movement relative to said disk and contained within said chamber;

a flexible electrical circuit disposed in a plane adjacent said planar surface of said cover member;

an elongated flexible cable having a proximal end and a distal end;

a span of conductive traces interconnecting said flexible electrical circuit and said flexible cable;

said cable and said span Joined at a side edge of said cable;

said base member defining a slot extending orthogonally to said cover interior surface; and said proximal end of said cable deflected from said plane of said flexible electrical circuit toward said base member and confined by and disposed within and oriented by said slot confronting opposite sides of said cable with said distal end extending from said slot, said distal end connected to said actuator, whereby said flexible cable is maintained in an orientation suitable for repeated flexing by movement of said actuator.

2. The direct access storage device of claim 1 further comprising:

a wall defining a passage extending through said base member;

said wall extending into said chamber and to a position proximate said cover member and having a terminus within said chamber and disposed proximate said cover interior surface.

3. The direct access storage device of claim 1 wherein said flexible circuit further comprises an electrical grounding connection disposed between and clamped by said cover and said base to connect said grounding connection to said base and said cover.

4. The direct access storage device of claim 3 wherein said flex circuit grounding connection comprises a hole extending therethrough to accommodate a fastener extending between said cover and base members.

5. A direct access storage device comprising:

a base member for supporting components of said device;

a cover member having a generally planar interior surface;

a recordable disk mounted for rotation within a chamber defined by said cover member and said base member;

said base member having a floor and a raised portion projecting from said floor toward said cover member, said raised portion defining a passage from inside said chamber through said raised portion to outside said base member;

an actuator mounted within said chamber for movement relative to said disk;

a flexible electrical circuit disposed adjacent said planar surface of said cover member;

a connector having a mating portion, connected to said flexible electrical circuit, said connector disposed within said passage and presenting said mating portion of said connector to said outside of said base member;

a seal disposed circumscribing said passage and interior to said chamber, between said raised portion and said cover member;

said flexible electrical circuit comprising a grounding tab with a hole extending through said tab and an elongated flexible cable portion having a proximal end and a distal end, said cable portion and said flexible electrical circuit joined at a side edge of said cable portion;

said raised portion of said base member defining a slot extending into said raised portion and orthogonal to said flexible electrical circuit;

a portion of said cable portion including said proximal end, disposed within said slot and a portion of said cable portion including said distal end extending from said slot, said distal end connected to said actuator, said grounding tab forcibly trapped between said cover member and said base member;

said chamber sealed by forcible engagement of said seal and said flexible electrical circuit with said raised portion and said cover member, whereby said cable portion is maintained in an orientation suitable for repeated flexing and said chamber is sealed from said outside of said base member.

6. A direct access storage device comprising:

a base member for supporting components of said device;

a cover member having a generally planar interior surface;

a data storage disk mounted for rotation within a chamber defined by said cover member and said base member;

an actuator mounted for movement relative to said disk and contained within said chamber;

a flexible electrical circuit disposed in a plane adjacent said planar surface of said cover member;

an elongated flexible cable having a proximal end and a distal end;

a span of conductive traces interconnecting said flexible electrical circuit and said flexible cable;

said cable and said span joined at a side edge of said cable;

said base member defining a slot extending orthogonally to said cover interior surface; and said proximal end of said cable deflected from said plane of said flexible electrical circuit toward said base member and confined by and disposed within and oriented by said slot confronting opposite sides of said cable with said distal end extending from said slot, said distal end connected to said actuator, a wall defining a passage extending through said base member;

said wall extending into said chamber and to a position proximate said cover member and having a terminus within said chamber and disposed proximate said cover interior surface; and said flexible circuit is compressively trapped intermediate said terminus and said cover and against said cover, whereby said compressive trapping seals said direct access storage device and said flexible cable is maintained in an orientation suitable for repeated flexing by movement of said actuator.

7. The direct access storage device of claim 6 further comprising a compressible seal surrounding said passage and engaging said terminus for compressive engagement with said flexible circuit.

8. The direct access storage device of claim 7 wherein said flexible circuit comprises a plugable connector disposed on one surface of said circuit and further disposed within said passage and circumscribed by said seal.

9. The direct access storage device of claim 8 wherein said flexible circuit further comprises an electrical grounding connection disposed between and clamped by said cover and said base to connect said grounding connection to said base and said cover.

10. The direct access storage device of claim 9 wherein said flex circuit grounding connection comprises a hole extending therethrough to accommodate a fastener extending between said cover and base members.

* * * * *